(12) United States Patent
Markiewicz

(10) Patent No.: US 6,223,885 B1
(45) Date of Patent: *May 1, 2001

(54) SHUTTLE CAR CONVEYOR FOR CONVEYABLE MATERIAL

(75) Inventor: James S. Markiewicz, Schererville, IN (US)

(73) Assignee: Captial Engineering, Inc., Hammond, IN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/978,259

(22) Filed: Nov. 25, 1997

(51) Int. Cl.[7] .................................................. B65G 37/00
(52) U.S. Cl. ...................................... 198/463.3; 198/468.6
(58) Field of Search ............................ 198/468.6, 463.3; 213/86, 98, 188; 104/162, 165, 169

(56) References Cited

U.S. PATENT DOCUMENTS

| 118,824 | * | 9/1871 | Smith et al. . | |
|---|---|---|---|---|
| 583,548 | * | 6/1897 | Price . | |
| 927,334 | * | 7/1909 | Dobbs . | |
| 1,462,188 | * | 7/1923 | Barks . | |
| 1,847,806 | * | 3/1932 | Banshak . | |
| 2,389,821 | * | 11/1945 | Shealy | 213/188 |
| 2,590,404 | * | 3/1952 | Hammond | 213/188 |
| 4,236,626 | * | 12/1980 | Noe | 198/468.6 |
| 4,311,244 | * | 1/1982 | Hindin et al. | 213/86 |
| 4,367,059 | * | 1/1983 | Stubbins | 198/468.6 |
| 4,387,800 | * | 6/1983 | Noe | 198/750 |
| 4,459,078 | * | 7/1984 | Chiantella et al. | 414/279 |
| 4,585,133 | * | 4/1986 | Cope | 213/188 |
| 4,669,391 | * | 6/1987 | Wicks et al. | 213/188 |
| 4,687,393 | * | 8/1987 | Thompson | 411/351 |
| 4,893,717 | * | 1/1990 | Berry et al. | 213/188 |
| 4,944,228 | * | 7/1990 | Rhodes | 104/172.3 |
| 4,971,508 | * | 11/1990 | Miyahara et al. | 414/282 |
| 5,025,912 | * | 6/1991 | Hashizume et al. | 198/459 |
| 5,103,965 | * | 4/1992 | Takahashi et al. | 198/468.6 |
| 5,560,503 | * | 10/1996 | Daugherty et al. | 213/188 |
| 5,617,965 | * | 4/1997 | Hawryszkow | 213/188 |

FOREIGN PATENT DOCUMENTS

143093 * 5/1985 (EP) .................................. 198/468.6

* cited by examiner

Primary Examiner—Christopher P. Ellis
Assistant Examiner—Khoi H. Tran
(74) Attorney, Agent, or Firm—Robert F. I. Conte; Lee Mann Smith; McWilliams Sweeney & Ohlson

(57) ABSTRACT

An apparatus for conveying conveyable material. The apparatus includes a plurality of cars joined together by a plurality of spacers. The spacers couple the cars a fixed distance apart to form a shuttle. The shuttle is guided along a track between a first position and a second position. In the first position, the shuttle is aligned with a first group of supports. The shuttle in the first position receives conveyable material from the supports. The shuttle in the second position is aligned with a second group of supports. The shuttle disposes the conveyable material from each of the cars carrying the conveyable material to the second group of supports. A drive means repeatedly drives the shuttle between the first position and the second position. The cars remain the fixed distance apart during the driving between the first position and the second position.

5 Claims, 8 Drawing Sheets

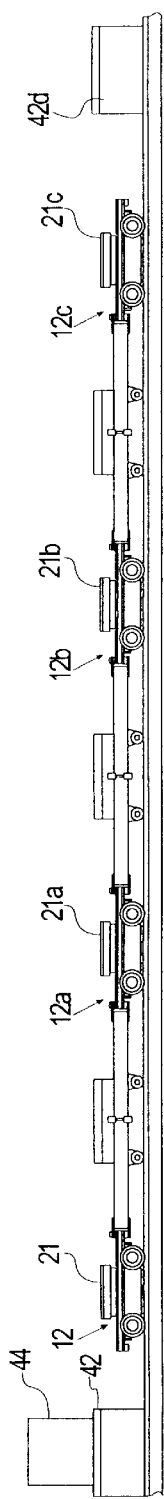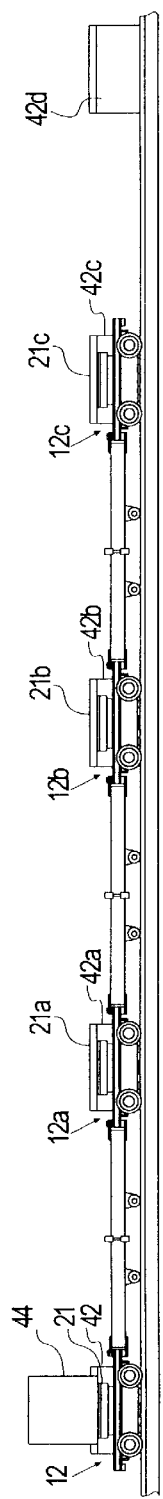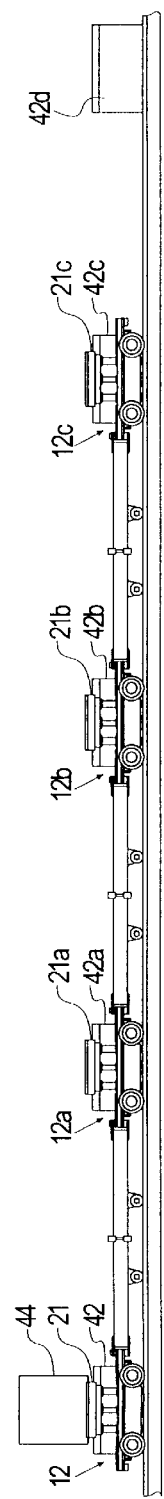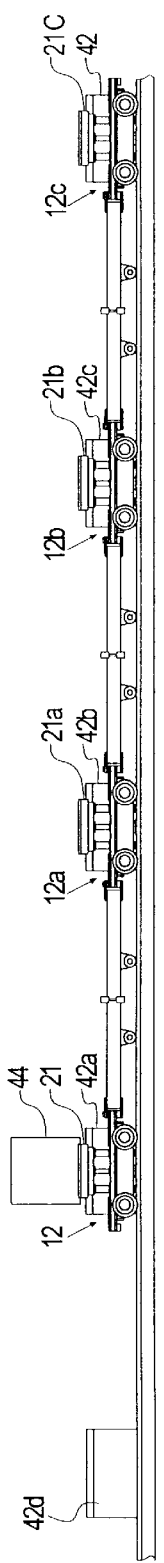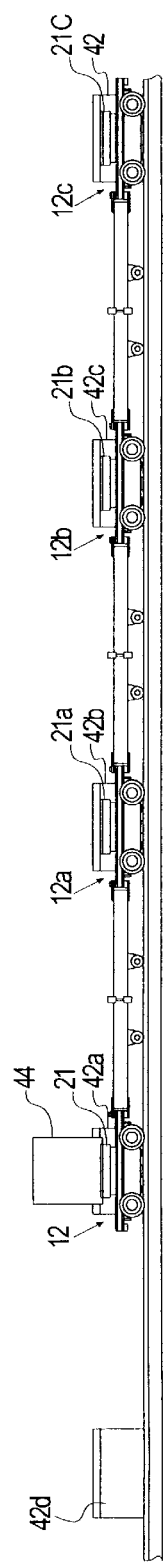
FIG. 5
FIG. 5a
FIG. 5b
FIG. 5c
FIG. 5d

SHUTTLE CAR CONVEYOR FOR CONVEYABLE MATERIAL

FIELD

The present invention relates to a shuttle for incrementally conveying materials and, more specifically, to a shuttle car conveyor for incrementally transporting conveyable materials downstream along a track.

BACKGROUND

Flat rolled products in the metals industry are commonly wound into coils. These coils are transported by coil conveying systems such as roller chain conveyors and walking beam conveyors.

The roller chain conveyors are comprised of a plurality of individual coil support pallets linked together by chain sections. Wheels mounted on bearings and axles support each pallet. Roll chain conveyors are generally driven by sprockets mounted on a rotating shaft. The rotating shaft is driven by a gear reducer and motor. The roller chain conveyor is guided by custom-machined track which is supported on structural steel. The disadvantages of this design are: 1) there are a lot of parts to maintain since each pallet has rollers, bearings and axles; 2) the chain stretches, which affects the positioning of the downstream coil; 3) the custom-machined track wears out due to the high load of the roller (wheel); 4) the individual components are difficult to repair; 5) the system is costly due to the number of component parts and the need for custom track; and 6) the conveyor speed is limited.

Walking beam conveyors are comprised of a multitude of coil support pallets mounted on a beam. The beam is supported on rollers. The conveyor indexes coils between stationary coil support saddles. The conveyor includes an elevating mechanism which lifts the coils up off of stationary saddles. The conveyor is then traversed, to index the coils to adjacent saddles downstream. The conveyor is usually driven by a hydraulic cylinder. The disadvantages of this design are: 1) the distance of traverse of the walking beam is limited by the length of the cylinder stroke, 2) the length of the beam conveyor is limited by manufacturing and shipping constraints, 3) the speed of the conveyor is limited by the operating speed of the drive cylinder, and 4) repairing the walking beam support rollers and elevating mechanisms requires major disassembly of the unit because the rollers and elevating mechanisms are fixed on foundations.

Accordingly, the present invention seeks to improve upon the previous apparatuses by providing a shuttle car conveyor comprising a plurality of individual cars. Each individual car of the shuttle conveyor is coupled to an adjacent individual car of the shuttle conveyor. A spacer couples the individual cars to positively space the cars a fixed distance during movement of the shuttle between a first position and a second position.

The shuttle car conveyor has several advantages. Connecting the cars to keep the cars a fixed distance apart when the shuttle is driven from the first position to the second position facilitates accurate positioning of the coils by the shuttle car conveyor. The fixed spacing also simplifies automation because the shuttle car conveyor can operate with only a single car having a drive mechanism.

Additionally, providing a shuttle car conveyor made up of individual cars simplifies maintenance. The cars can be easily disassembled and repaired as separate modules. Further, providing individual cars allows the shuttle to continue operating even if one of the car's motors is not functioning.

The shuttle car conveyor can be easily adapted to various systems. The shuttle car conveyor can be lengthened by adding car modules or spacers, or by lengthening the spacers. The shuttle car conveyor design allows for the use of standard rails. The option of using either electric motor, hydraulic motor or cable drum drive to power the shuttle allows the shuttle to operate at higher speeds than the chain conveyor system or walking beam conveyor system.

SUMMARY

The shuttle conveyor system has a plurality of cars. A plurality of spacers couple the plurality of cars a fixed distance apart to form a shuttle. A track provides a pathway along which the shuttle is driven.

The system has a plurality of supports. Each support is for supporting conveyable material. The plurality of supports has a first support and a last support. The amount of supports is at least one more in number than the amount of cars forming the shuttle.

The shuttle has a first position along the pathway. In the first position, each of the cars forming the shuttle has a predetermined alignment with a different corresponding support. These different corresponding supports form a first group of supports selected from the plurality of supports.

The shuttle has a second position along the pathway. In the second position each of the cars forming the shuttle has a predetermined alignment with a different corresponding support. These different corresponding supports form a second group of supports selected from the plurality of supports. The first and second group of supports have at least one support in common. The first group of supports contains the first support, which is exclusive of the second group. The second group of supports contains the last support, which is exclusive of the first group. The second position is downstream along the pathway from the first position.

The shuttle car conveyor system has disposing means for disposing the conveyable material from each of the first group of different corresponding supports to each of the cars in the first position and for disposing the conveyable material from each of the cars in the second position to each of the second group of different corresponding supports.

A driving means repeatedly drives the shuttle between the first and second positions to convey conveyable material from the first support to the last support.

The invention is further characterized in that the supports are saddles, and each of the saddles supports conveyable material over the cars in the first position.

The invention is still further characterized in that the plurality of spacers are a plurality of elongated lengths of rigid material. Each length of elongated material has a first end and a second end. Each first end is coupled to a different one of said cars. Each second end is coupled to another different one of said cars. Each first end coupled to said different one of said cars is coupled by a tapered pin; each second end coupled to said another different one of said cars is coupled by a tapered pin.

The invention can still be further characterized in that the means for disposing is made up of a plurality of elevating platens. Each platen is coupled to a different one of the plurality of cars. The platens have an elevated position in which each platen passes through a different chasm defined by a different one of the saddles.

These and other features, novelties and advantages of the present invention can be understood by reference to the brief description of the drawings, the detailed description and the appended drawings and appended claims.

BRIEF DESCRIPTION OF THE DRAWINGS

FIG. 3 shows the coil supported on a stationary support saddle.

FIGS. 5–5d, 6–6c, 7–7c, 8, and 9–9d illustrate the four-car shuttle car conveyor in operation.

DETAILED DESCRIPTION

Figure 1:
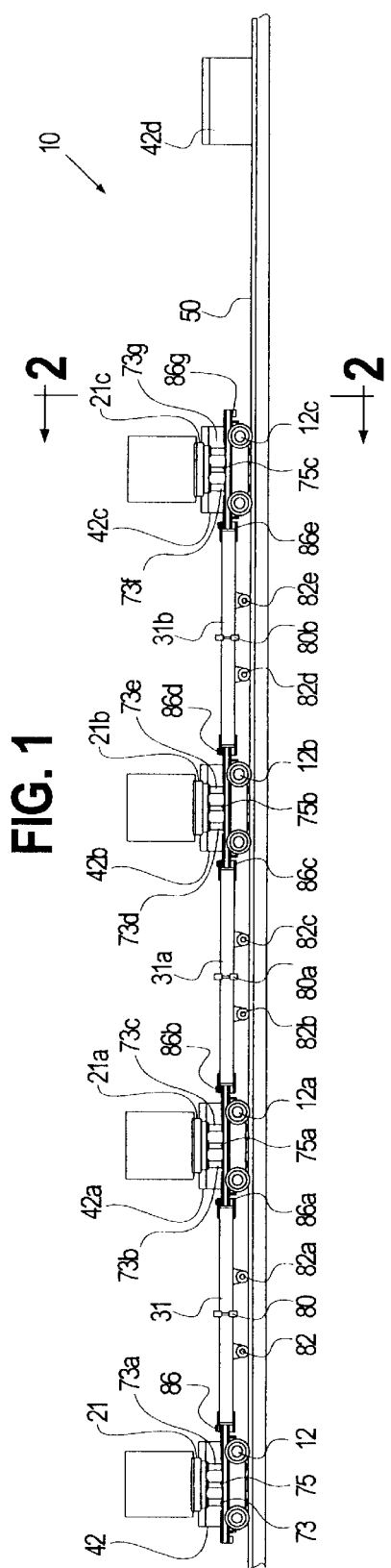
FIG. 1 is a side elevation of a four-car shuttle car conveyor system in accordance with the preferred embodiment of the invention.
Figure 2:
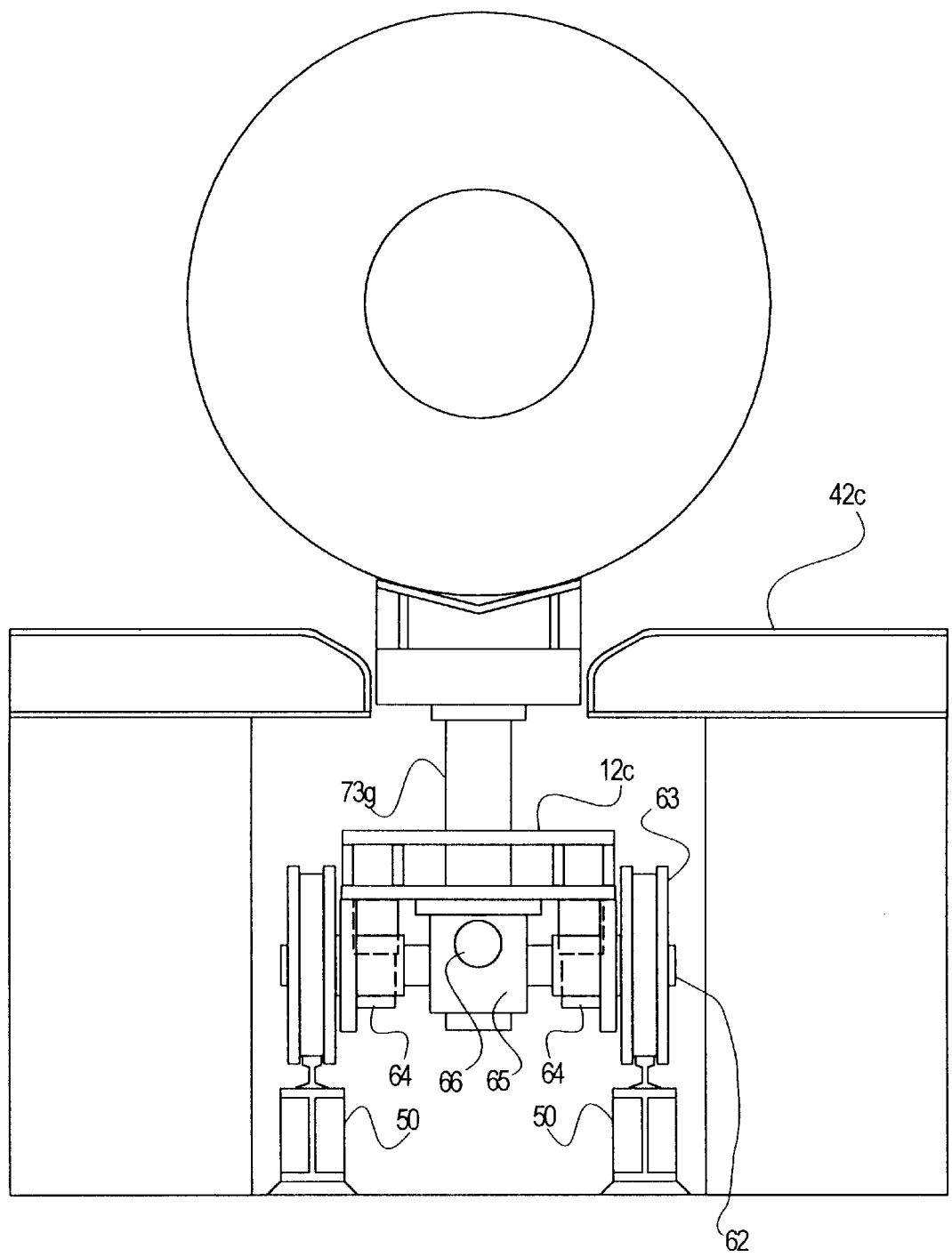
FIG. 2 is a cross-section taken along lines 2—2 of FIG. 1 which illustrates a coil supported on an elevating platen.

In accordance with the preferred embodiment of the invention shown in FIGS. 1–4, a four-car and five-saddle shuttle car conveyor system 10 is provided. The system has cars 12, 12a, 12b, 12c; elevating platens 21, 21a, 21b, 21c; spacer trolleys 31, 31a, 31b; coil saddles 42, 42a, 42b, 42c, 42d; and track 50. The plurality of cars connected by the spacer trolleys forms a shuttle car conveyor.

Figure 3:
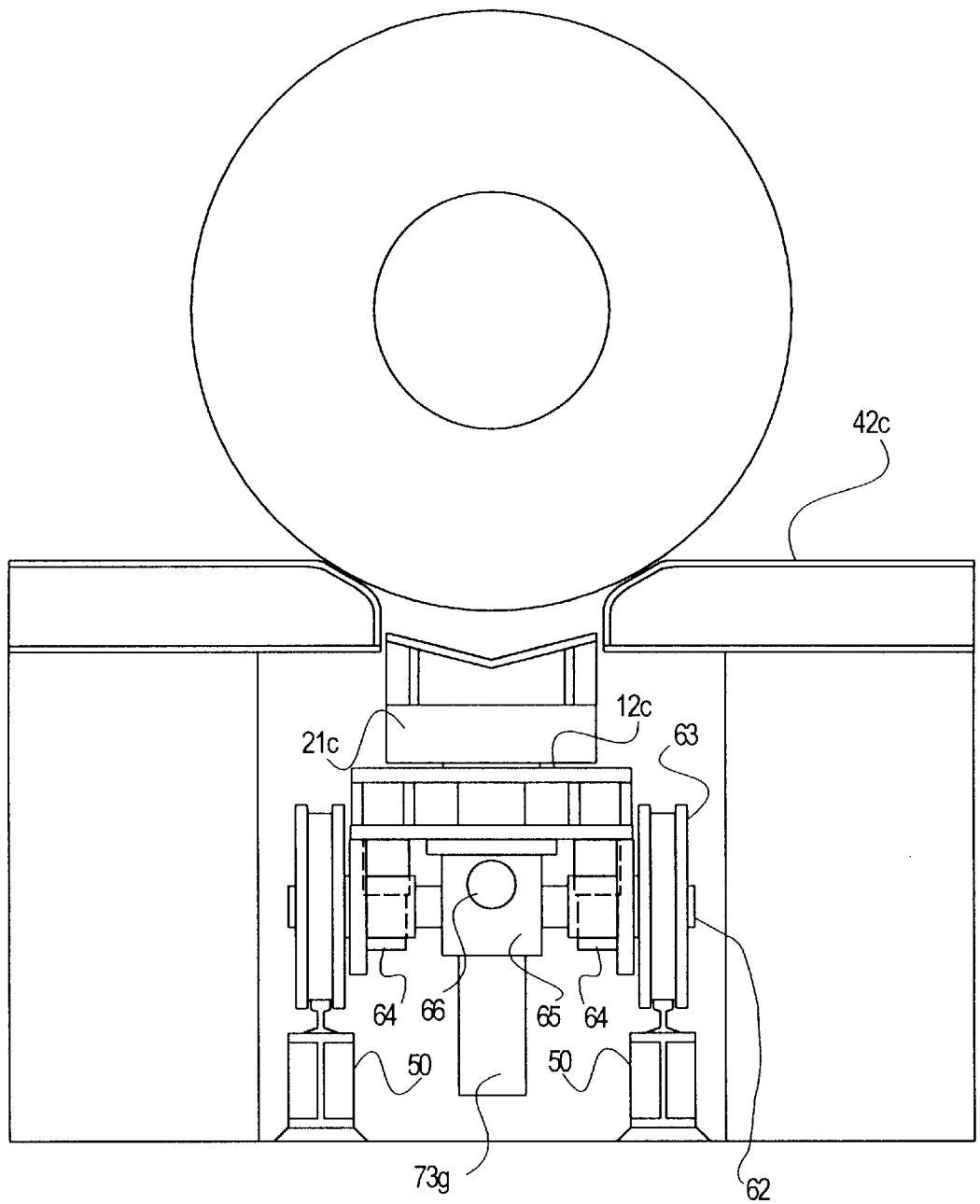
FIG. 3 is also a cross-section taken along lines 2—2 of FIG. 1, except

Each car is generally fabricated of steel plate. Each car has two axles 62 and four wheels 63. Each car axle 62 is mounted on two pillow block bearings 64. The wheels are typically rim toughed wheels. As shown in FIG. 3, the wheels are adapted to be disposed on standard rails of steel beam track 50. The cars shown are driven by electric or hydraulic motors 66. The electric motor is used to provide direct electric motor driven axles on said plurality of cars or in the case of a hydraulic motor, direct hydraulic motor driven axles on said plurality of cars. There are other methods to drive the shuttle car conveyor. These include: 1) a motor driven cable drum drive mounted either on or off the cars, 2) a rack and pinion arrangement, 3) a hydraulic cylinder, or 4) chains and sprockets.

Each elevating platen 21, 21a, 21b, 21c is fabricated of heavy steel plate in a v-saddle configuration to center and retain a metal coil on the platen. The platens are mounted on guide rods 73, 73a, 73b, 73c, 73d, 73e, 73f, 73g. Each platen is raised/lowered by a hydraulic cylinder 75, 75a, 75b, 75c. Alternatively, the elevating platens may also be incorporated into the coil support saddles 42–42d rather than on the cars.

The cars are mechanically linked together by spacers 31, 31a, 31b. The spacers shown are long and include a flange joint 80, 80a, 80b to facilitate manufacturing and shipment. Additionally, wheel/axle assemblies 82, 82a, 82b, 82c, 82d, 82e are included for intermediate support of the spacers. The wheel/axle assemblies are supported in any suitable manner such as pillow block bearings. In the preferred embodiment, the spacers 31, 31a, 31b are constructed of rectangular welded structural steel tubing.

Figure 4:
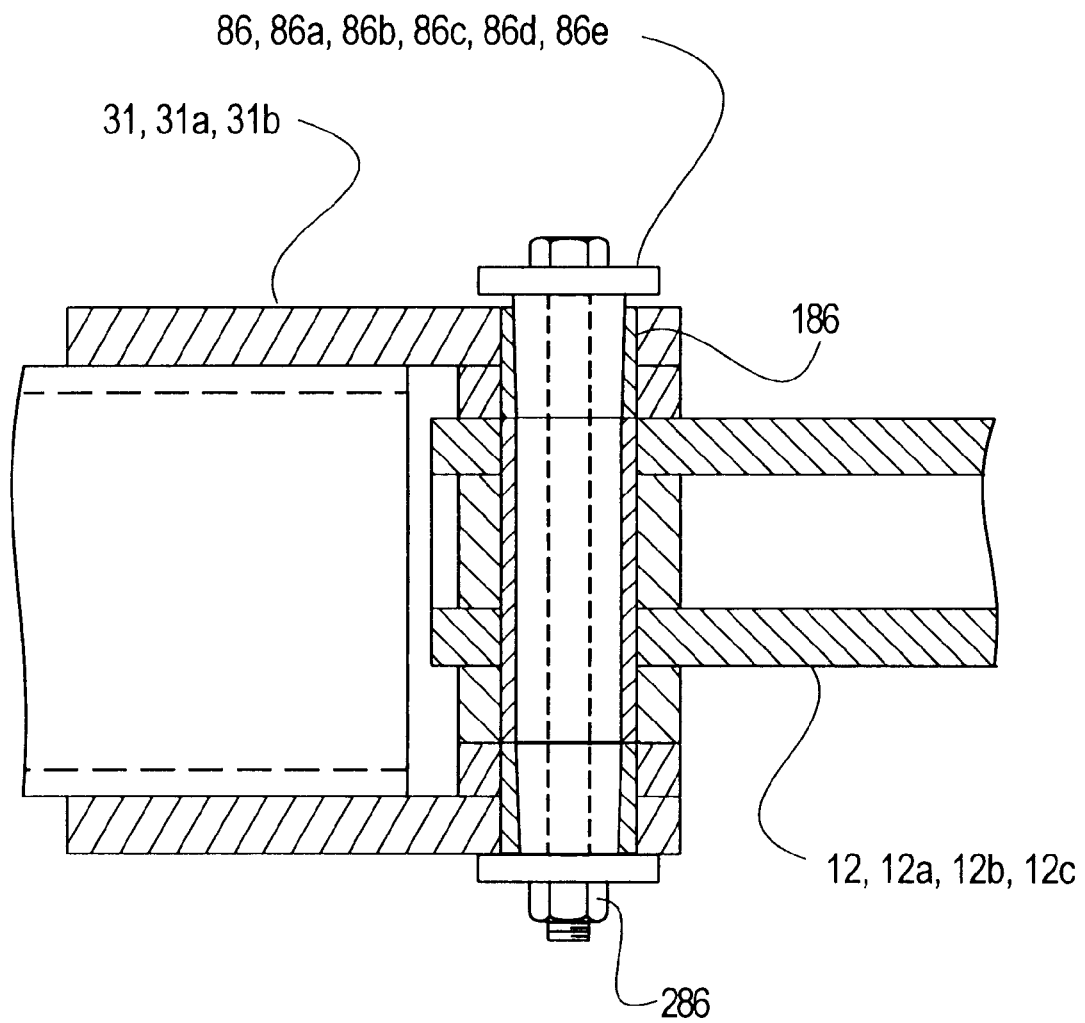
FIG. 4 is a cross-section of a tapered connecting pin which joins a car and spacer.

The spacers are connected to each car by a tapered pin arrangement 86, 86a, 86b, 86c, 86d, 86e as shown in FIG. 4. The tapered pin section reduces the clearance between the pin and the spacer to minimize play between the cars and spacers. The tapering also facilitates pin removal. As can be seen in FIG. 4, the tapered pin has a tapered portion 186 and a portion which receives a bolt 286. The tapered portion is opposite the portion which receives the bolt.

The conveyor system incrementally conveys metal coils deposited on saddle 42 downstream until each coil reaches saddle 42d. The shuttle car conveyor incrementally conveys coils downstream by alternating between a first position and a second position. In the first position, the shuttle car conveyor is oriented to always position cars 12, 12a, 12b and 12c, respectively, at saddles 42, 42a, 42b and 42c. In the first position, the platens rise and the shuttle car conveyor picks up coils previously deposited on any one of saddles 42–42c. (See FIGS. 5a, 5b). The shuttle then moves to the second position.

In the second position, the shuttle car conveyor is always oriented to position cars 12, 12a, 12b and 12c respectively at saddles 42a, 42b, 42c and 42d. Thus, in the second position the shuttle car conveyor is oriented to position each car one saddle downstream relative to each car's orientation in position #1. (See FIGS. 5c, 5d). Therefore, in the second position, the shuttle car conveyor deposits each picked-up coil one saddle downstream from the coil's previous position. By driving the shuttle between position #1 and position #2, the shuttle can convey a continuous stream of coils from saddle 42 to saddle 42d. A coil, once conveyed to saddle 42d, is removed to free saddle 42d to accept another conveyed coil.

FIGS. 5–9 illustrate the operation in detail.

Figure 6:
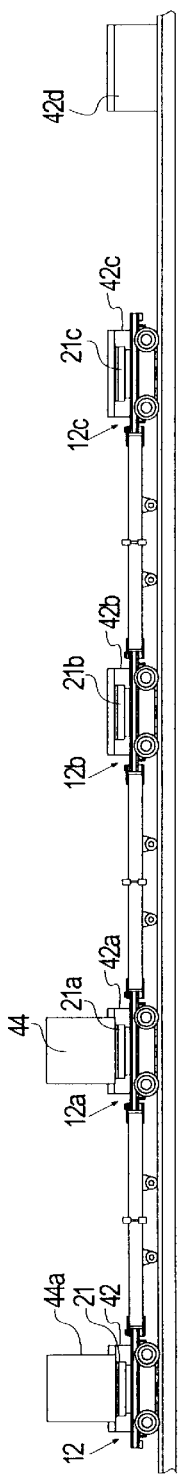
Figure 6A:
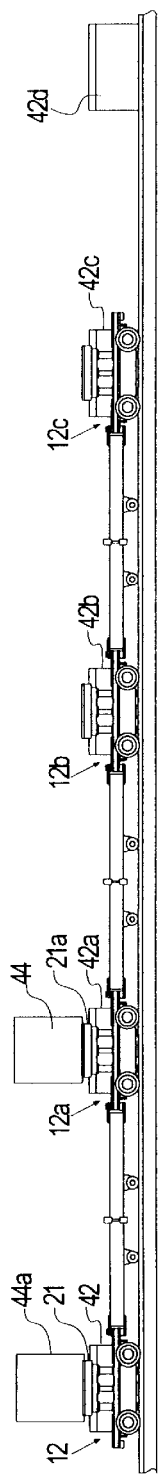
Figure 6B:
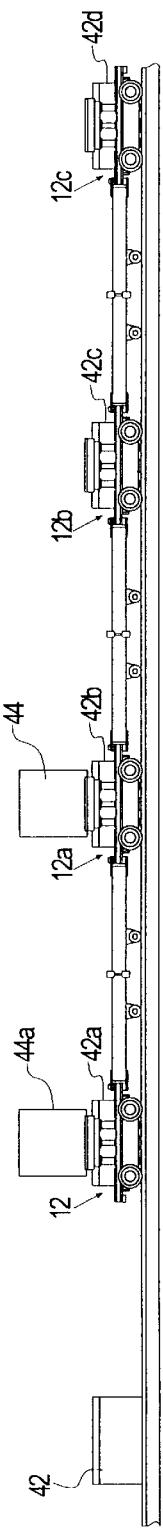
Figure 6C:
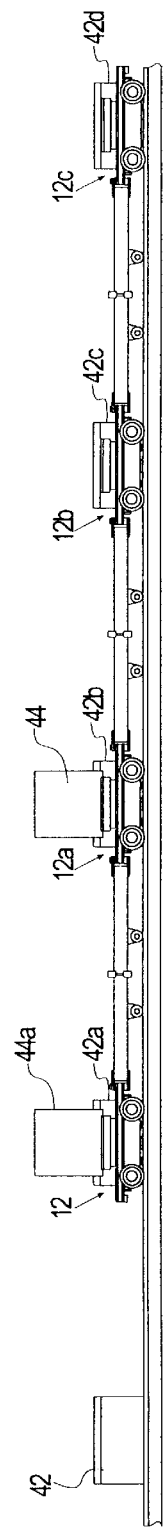
Figure 7:
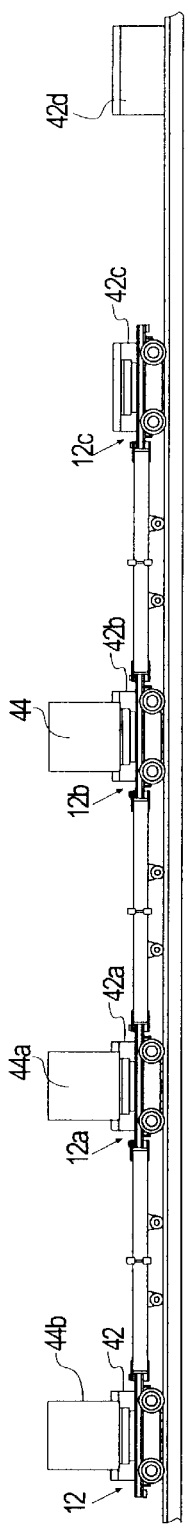
Figure 7A:
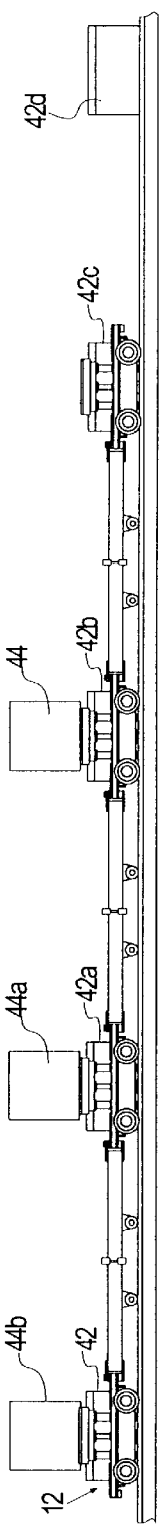
Figure 7B:
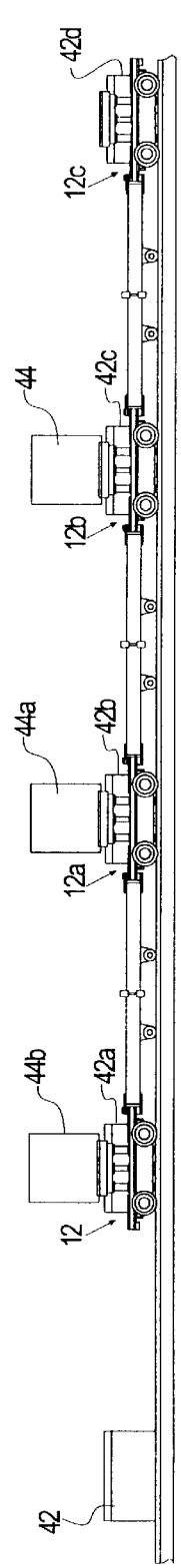
Figure 7C:
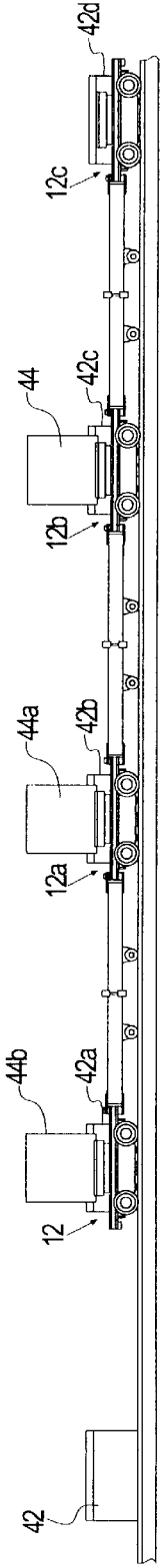

Coil 44 is loaded onto stationary coil support saddle 42 by an overhead crane or coil ram tractor (fork-type tractor) or another shuttle (not shown). The shuttle car conveyor is then driven to position the shuttle in the first position (see FIGS. 5 and 5a). Once positioned, the elevating platens of the cars rise. Platen 21 associated with car 12 raises coil 44 off saddle 42 (see FIG. 5b). The shuttle car conveyor is then driven to position the shuttle in the second position. Once positioned, the elevating platens of the cars lower. Elevating platen 21 associated with car 12 lowers coil 44 on support saddle 42a (see FIGS. 5c and 5d). The shuttle car conveyor is then driven back to position #1. By this time another coil 44a has been deposited on saddle 42 (see FIG. 6). The elevating platens on the cars rise. Platen 21 associated with car 12 raises coil 44a off support saddle 42, and platen 21a associated with car 12a raises coil 44 off support saddle 42a (see FIG. 6a). The shuttle is then driven to position #2 (see FIG. 66b). The elevating platens on the cars lower. Platen 21a associated with car 12a lowers coil 44 on saddle 42b and platen 21 associated with car 12 lowers coil 44a on saddle 42a (see FIG. 6c). The shuttle car conveyor is then driven back to position #1. The cars' platens rise. Platen 21 associated with car 12 picks up newly deposited coil 44b from saddle 42; platen 21a associated with car 12a picks up coil 44a from saddle 42a; platen 21b associated with car 12b picks up coil 44 from saddle 42b (see FIGS. 7 and 7a). The shuttle is then driven back to position #2. At position #2, coil 44 is lowered on saddle 42c; coil 44a is lowered on saddle 42b; and coil 44b is lowered on saddle 44a (FIGS. 7b and 7c).

Figure 8:
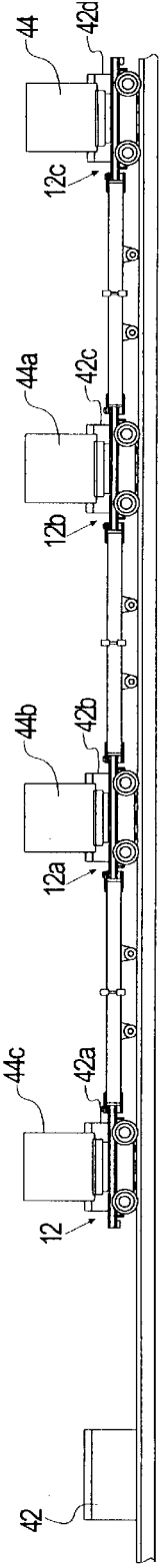

The incremental conveying of coils downstream is repeated until coil 44 has been conveyed to saddle 42d, coil 44a has been conveyed to saddle 42c, coil 44b has been conveyed to saddle 42b, and a newly deposited coil 44c has been conveyed to saddle 42a (see FIG. 8).

Figure 9:
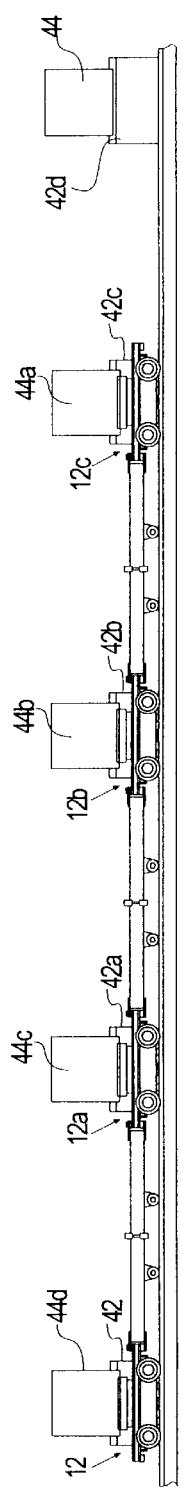
Figure 9A:
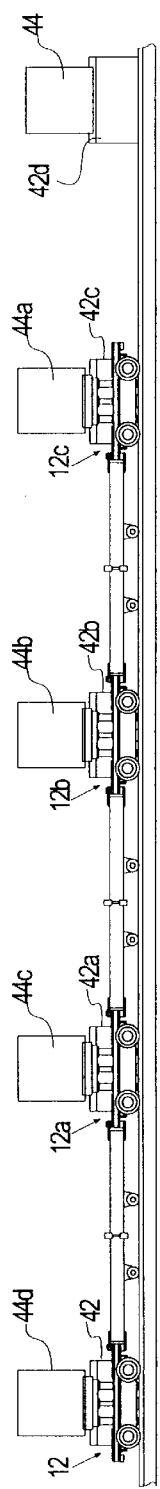
Figure 9B:
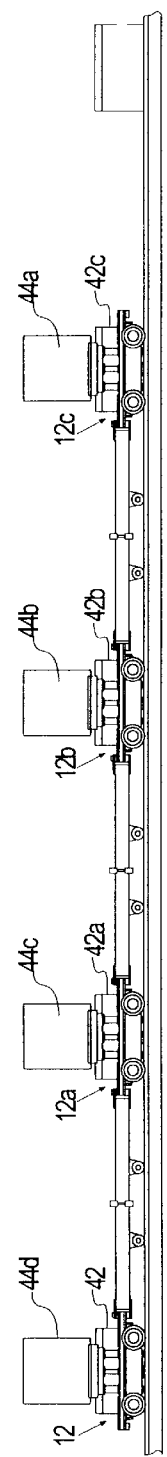
Figure 9C:
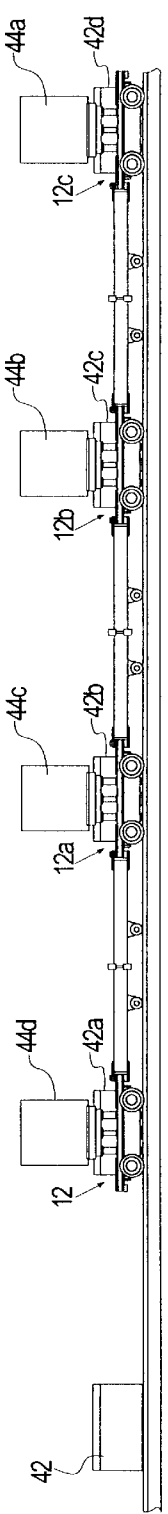
Figure 9D:
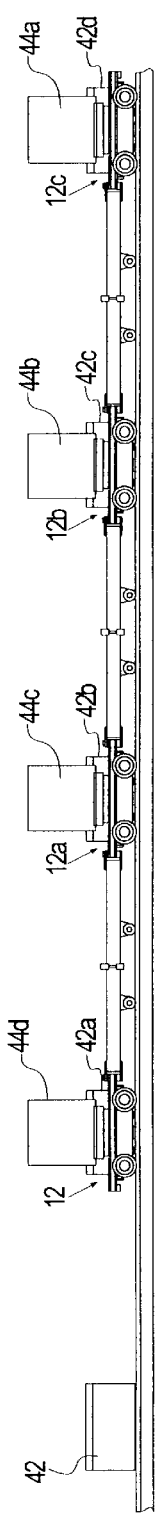

Continuing on, another coil 44d is deposited on saddle 42. The shuttle car conveyor is then driven back to position #1. The platens rise and the coils 44–44d are raised off their respective saddles (see FIGS. 9 and 9a). Prior to the shuttle traversing back to position #2, a crane or perhaps another shuttle car conveyor (not shown) removes coil 44 from saddle 42d. The removal frees saddle 42d to receive coil 44a. (See FIG. 9b). The shuttle car conveyor is then driven to position #2. The shuttle in position #2 deposits its coils: coil 44a is deposited on saddle 42d; coil 44b is deposited on saddle 42c; coil 44c is deposited on saddle 42b; and coil 44d is deposited on saddle 42a (see FIGS. 9c and 9d).

By driving the shuttle car conveyor between position #1 and position #2, coils deposited on saddle 42 are continuously incrementally conveyed downstream to saddle 42d. The coils deposited on saddle 42d are continuously removed to allow the shuttle car conveyor to continue to convey newly deposited coils downstream. The shuttle car conveyor can simultaneously convey downstream an amount of coils equal to the number of cars making up the shuttle car conveyor.

The number of cars in the shuttle, the number of coil support saddles, and the length of the spacers are dependent on cycle time and distance requirements of a particular application. If the distance between the cars is long, wheels are coupled to the spacers for support.

The shuttle car conveyor has several advantages. Connecting the cars to keep the cars a fixed distance apart when the shuttle is driven from the first position to the second position facilitates accurate positioning of the coils by the shuttle car conveyor. The fixed spacing also simplifies automation because the shuttle car conveyor can operate with only a single car having a drive mechanism.

Additionally, providing a shuttle car conveyor made up of individual cars simplifies maintenance. The cars can be easily disassembled and repaired as separate modules. Further, providing individual cars allows the shuttle to continue operating even if one of the car's motors is not functioning.

The shuttle car conveyor can be easily adapted to various systems. The shuttle car conveyor can be lengthened by adding car modules or spacers, or by lengthening the spacers. The shuttle car conveyor design allows for the use of standard rails. The option of using either electric motor, hydraulic motor or cable drum drive to power the shuttle allows the shuttle to operate at higher speeds than the chain conveyor system or walking beam conveyor system.

It is important to note that the present invention has been described with reference to specific examples. It would be apparent to those skilled in the art that a person understanding this invention may conceive of changes or other embodiments or variations which utilize the principles of the invention without departing from the scope of the invention as set forth in the appended claims. The specification and drawings are therefore to be regarded in an illustrative rather than a restrictive sense. Accordingly, it is not intended that the invention be limited except as may be necessary in view of the appended claims.

What is claimed is:

1. An apparatus for conveying conveyable material, said apparatus comprising:

a plurality of cars, said plurality of cars having a first car and a last car;

a plurality of spacers coupling said plurality of cars, said plurality of cars coupled a distance apart by said spacers to form a shuttle;

a track to guide said shuttle;

a pathway defined by said track wherein said shuttle is driven on said track along said pathway;

a plurality of supports arranged along said pathway, each support for supporting said conveyable material, said plurality of supports having a first support and a last support, said plurality of supports being at least one more in number than said plurality of cars;

a first position of said shuttle along said pathway, in said first position each of said plurality of cars forming said shuttle has a predetermined alignment with a different corresponding support, each different corresponding support forming a first group of supports selected from said plurality of supports;

a second position of said shuttle along said pathway, said second position downstream from said first position, in said second position each of said plurality of cars forming said shuttle has a predetermined alignment with a different corresponding support, said different corresponding supports forming a second group of supports selected from said plurality of supports, said first and second group of supports having at least one support in common, the first support is in the first group of supports and exclusive of the second group, said last support is in said second group of supports and exclusive of said first group;

disposing means for disposing said conveyable material from each of said first group of different corresponding supports to each of said cars in said first position and for disposing said conveyable material from each of said cars in said second position to each of said second group of different corresponding supports;

at least one car having direct motor driven axles for repeatedly driving said shuttle from said first position to said second position, and from said second position to said first position, and wherein said plurality of cars forming said shuttle remain a fixed distance apart during a repeated driving of said shuttle from said first position to said second position and from said second position to said first position, and wherein said first position marks a beginning of said pathway and said second position marks an end of said pathway;

each of said plurality of cars has a plurality of couplings, and wherein said plurality of spacers are a plurality of elongated lengths of rigid material, each elongated length of rigid material having a first end and a second end;

each first end of said plurality of spacers is removably coupled to one of said couplings of one of said plurality of cars, and wherein each second end is removably coupled to a different one of said couplings of a different one of said plurality.

2. The apparatus of claim 1 further comprising:

a plurality of tapered members, each tapered member of said plurality coupling at least one spacer to one coupling;

wherein the tapered member has a tapered portion and a portion which receives a bolt, the tapered portion opposite the portion which receives the bolt;

and wherein when one of said elongated members is coupled to one of said couplings, said tapered portion lies within an aperture defined by said one coupling.

3. The apparatus for conveying as claimed in claim 1 wherein said plurality of supports are saddles and wherein said saddles support said conveyable material over said plurality of cars in said first position.

4. The apparatus for conveying as claimed in claim 1 wherein said disposing means compromises:

a plurality of elevating platens, each elevating platen coupled to a different one of said plurality of cars.

5. The apparatus for conveying as claimed in claim 4 further comprising:

a plurality of chasms, each chasm defined by a different one of said plurality of saddles;

a plurality of elevating platens forming said disposing means;

a raised position for said elevating platens wherein in said raised position, each of said platens is elevated to extend into a different one of said plurality of chasms.

* * * * *